United States Patent
Ghisoni et al.

(10) Patent No.: US 8,439,441 B2
(45) Date of Patent: May 14, 2013

(54) ADJUSTABLE LUMBAR ASSEMBLY FOR VEHICLE SEATS

(75) Inventors: Giuseppe Ghisoni, Milan (IT); Roberto D'Agostini, Piossasco (IT); Luca Tomasi, Grugliasco (IT)

(73) Assignee: Lear Corporation, Southfield, MI (US)

( * ) Notice: Subject to any disclaimer, the term of this patent is extended or adjusted under 35 U.S.C. 154(b) by 167 days.

(21) Appl. No.: 12/893,706

(22) Filed: Sep. 29, 2010

(65) Prior Publication Data

US 2012/0074744 A1   Mar. 29, 2012

(51) Int. Cl.
*B60N 2/02* (2006.01)
(52) U.S. Cl.
USPC ........................................... 297/284.4
(58) Field of Classification Search ............... 297/284.2, 297/284.4
See application file for complete search history.

(56) References Cited

U.S. PATENT DOCUMENTS

| | | |
|---|---|---|
| 5,050,930 A | 9/1991 | Schuster et al. |
| 5,397,164 A | 3/1995 | Schuster et al. |
| 5,462,335 A | 10/1995 | Seyler |
| 5,498,063 A | 3/1996 | Schuster et al. |
| 5,507,559 A * | 4/1996 | Lance ............... 297/284.4 X |
| 5,518,294 A | 5/1996 | Ligon, Sr. et al. |
| 5,626,390 A | 5/1997 | Schuster et al. |
| 5,685,606 A | 11/1997 | Lance |
| 5,769,490 A | 6/1998 | Falzon |
| 5,775,773 A | 7/1998 | Schuster et al. |
| 5,823,620 A | 10/1998 | Le Caz |
| 5,913,569 A | 6/1999 | Klingler |
| 5,954,399 A | 9/1999 | Hong |
| 6,003,941 A | 12/1999 | Schuster, Sr. et al. |
| 6,254,187 B1 | 7/2001 | Schuster, Sr. et al. |
| 6,296,308 B1 | 10/2001 | Cosentino et al. |
| 6,375,262 B1 | 4/2002 | Watanabe |
| 6,447,061 B1 | 9/2002 | Klingler |
| 6,536,840 B1 | 3/2003 | Schuster, Sr. et al. |
| 6,623,076 B2 | 9/2003 | Klingler |
| 6,637,817 B1 | 10/2003 | Christopher et al. |
| 6,644,740 B2 | 11/2003 | Holst et al. |
| 6,666,511 B2 | 12/2003 | Schuster et al. |
| 6,682,144 B2 | 1/2004 | Klingler |
| 6,692,074 B1 | 2/2004 | Kopetzky et al. |
| 6,746,081 B1 | 6/2004 | Klingler |
| 6,789,846 B2 | 9/2004 | Humer et al. |
| 6,837,541 B2 | 1/2005 | Farquhar et al. |
| 6,860,559 B2 | 3/2005 | Schuster, Sr. et al. |
| 6,869,142 B2 | 3/2005 | Heidmann et al. |
| 6,880,886 B2 | 4/2005 | Bodnar et al. |

(Continued)

FOREIGN PATENT DOCUMENTS

| | | |
|---|---|---|
| EP | 0420824 B1 | 1/1994 |
| EP | 0537839 B1 | 6/1997 |
| EP | 0698360 B1 | 3/2000 |
| EP | 1908628 A1 | 4/2008 |

*Primary Examiner* — Rodney B White
(74) *Attorney, Agent, or Firm* — Brooks Kushman P.C.

(57) ABSTRACT

A lumbar assembly has a wireframe for attachment to a frame of a vehicle seat. The wire frame has first and second spaced apart side members. First and second flexible lumbar support bands are each mounted to a wire frame side member, and each have a lateral portion extending inboard with a guide member. The guide members of the first and second lumbar support bands cooperate so that the lumbar support bands are adjusted in a fore and aft direction by translating the lateral portions relative to each other along the guide members.

17 Claims, 4 Drawing Sheets

U.S. PATENT DOCUMENTS

| | | |
|---|---|---|
| 6,883,867 B2 | 4/2005 | Klingler |
| 6,908,153 B2 | 6/2005 | Blendea |
| 6,918,634 B2 | 7/2005 | Elliot |
| 6,932,430 B2 | 8/2005 | Bedford et al. |
| 6,957,863 B2 | 10/2005 | Heidmann et al. |
| 6,983,989 B1 | 1/2006 | Veine et al. |
| 6,991,288 B2 | 1/2006 | Farquhar et al. |
| 7,044,544 B2 | 5/2006 | Humer et al. |
| 7,048,335 B2 | 5/2006 | Norman et al. |
| 7,083,231 B2 | 8/2006 | Schuster, Sr. et al. |
| 7,083,232 B2 | 8/2006 | Frank |
| 7,097,247 B2 | 8/2006 | Battey et al. |
| 7,128,372 B2 | 10/2006 | Farquhar et al. |
| 7,131,694 B1 | 11/2006 | Buffa |
| 7,163,261 B2 | 1/2007 | Kawashima |
| 7,165,811 B2 | 1/2007 | Bodnar et al. |
| 7,185,950 B2 | 3/2007 | Pettersson et al. |
| 7,204,552 B2 | 4/2007 | Ishizuka |
| 7,226,130 B2 | 6/2007 | Tubergen et al. |
| 7,234,769 B2 | 6/2007 | Takenaka et al. |
| 7,234,774 B2 | 6/2007 | Heidmann et al. |
| 7,237,838 B2 | 7/2007 | Hoffmeister et al. |
| 7,252,335 B2 | 8/2007 | Samain et al. |
| 7,264,311 B2 | 9/2007 | Heidmann |
| 7,284,794 B2 | 10/2007 | Yamaguchi et al. |
| 7,303,231 B2 | 12/2007 | Frank |
| 7,318,626 B2 | 1/2008 | Ohchi et al. |
| 7,328,950 B2 | 2/2008 | McMillen et al. |
| 7,334,845 B2 | 2/2008 | Peterson et al. |
| 7,344,190 B2 | 3/2008 | Haglund et al. |
| 7,360,835 B2 | 4/2008 | Tubergen et al. |
| 7,364,231 B2 | 4/2008 | Park et al. |
| 7,425,036 B2 | 9/2008 | McMillen |
| 7,520,565 B2 | 4/2009 | Kim |
| 7,540,562 B2 | 6/2009 | Sekida |
| 7,568,763 B2 | 8/2009 | Bedford et al. |
| 7,585,027 B2 | 9/2009 | Blendea |
| 2006/0103189 A1 | 5/2006 | Humer et al. |
| 2007/0144301 A1 | 6/2007 | Kopetzky et al. |
| 2009/0001785 A1 | 1/2009 | Swan et al. |
| 2009/0008976 A1 | 1/2009 | Weinmueller |
| 2009/0102255 A1 | 4/2009 | D'Agostini et al. |
| 2010/0066136 A1 | 3/2010 | D'Agostini |

* cited by examiner

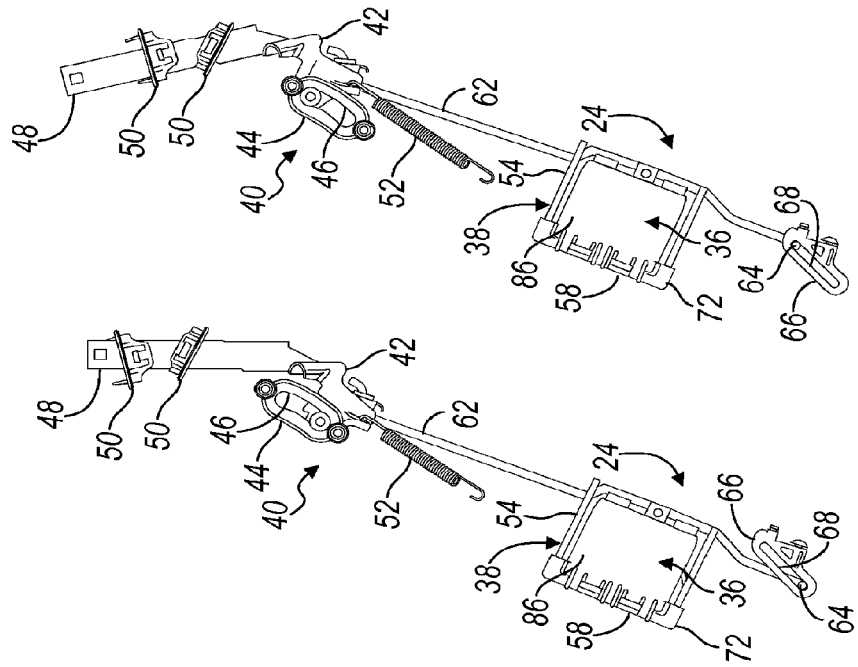
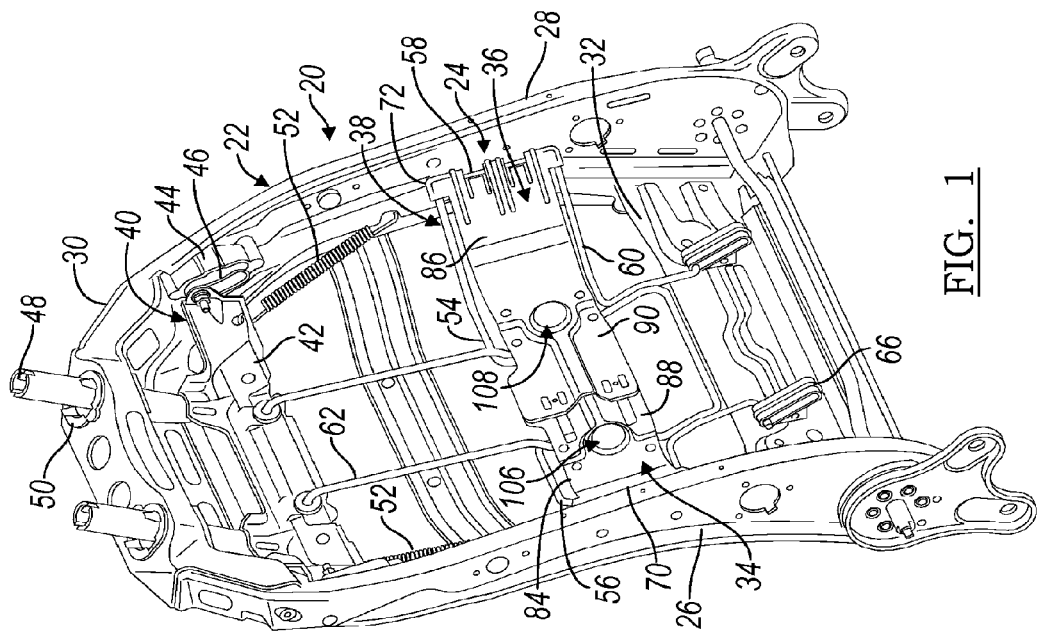

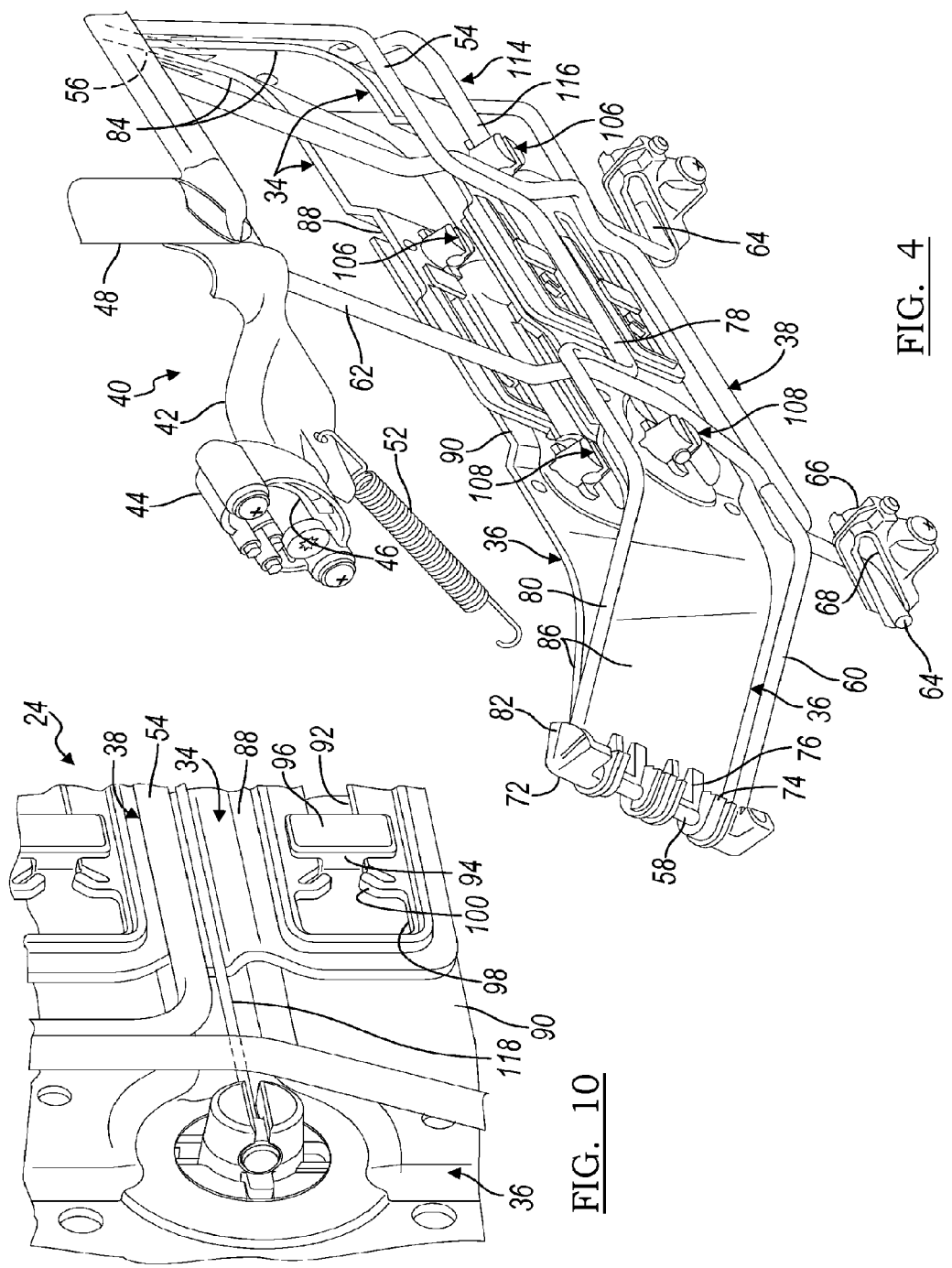

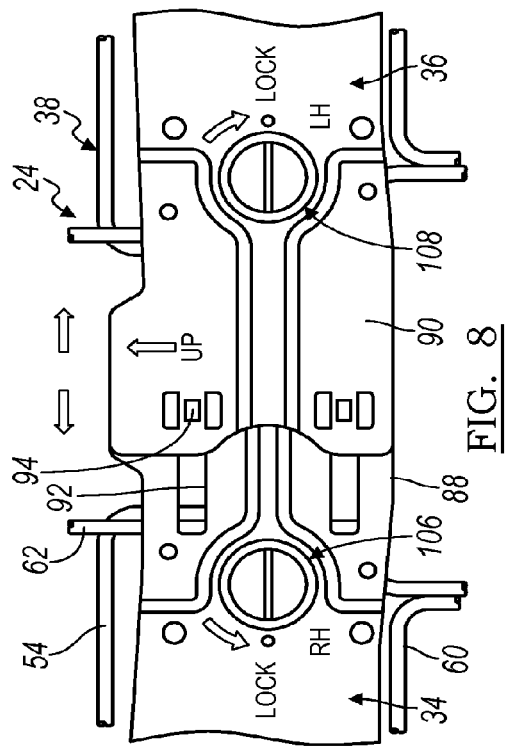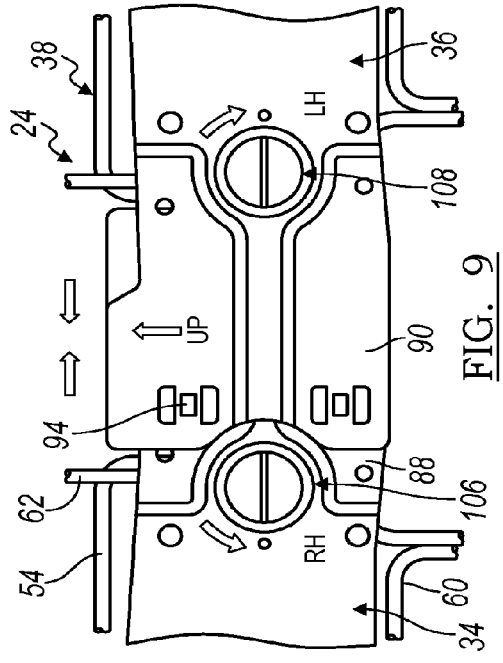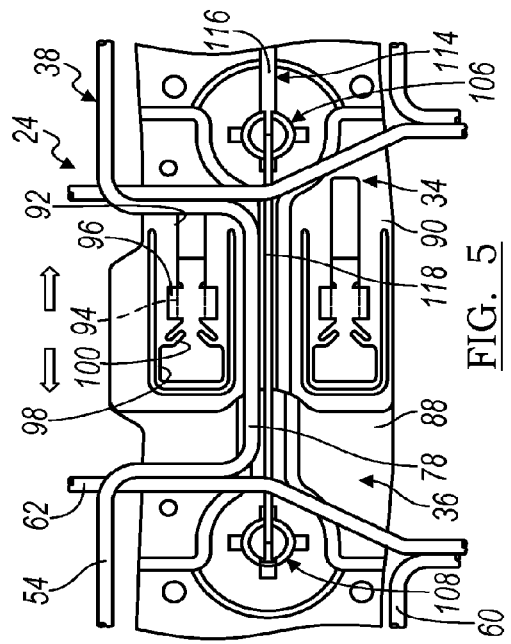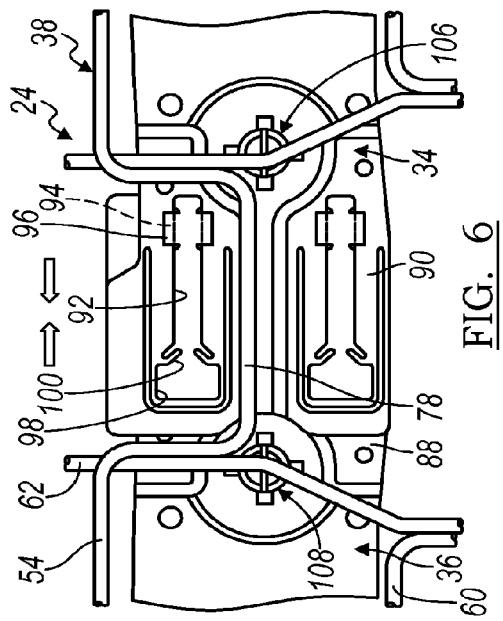

ADJUSTABLE LUMBAR ASSEMBLY FOR VEHICLE SEATS

TECHNICAL FIELD

Various embodiments relate to adjustable lumbar assemblies for vehicle seats.

BACKGROUND

Prior art vehicle seats have been provided with horizontal lumbar assemblies. Prior art vehicle seats have also been provided with active head restraint systems. An example of a vehicle seat with a horizontal lumbar suspension and an active head restraint system is disclosed in U.S. Patent Application Publication No. 2009/0102255 A1, which published on Apr. 23, 2009 to D'Agostini et al.

BRIEF DESCRIPTION OF THE DRAWINGS

FIG. 1 is a front side perspective view of a seat back of a vehicle seat according to embodiments of the invention, illustrated with a lumbar assembly and an active head restraint system;

FIG. 2 is a side elevation view of the lumbar assembly and active head restraint system of FIG. 1, illustrated in a design position;

FIG. 3 is another side elevation view of the active head restraint system and lumbar assembly of FIG. 1, illustrated in an actuated position;

FIG. 4 is an enlarged rear perspective view of the active head restraint system and the lumbar assembly of FIG. 1, illustrated with the lumbar assembly in a retracted and an extended position;

FIG. 5 is an enlarged rear elevation view of the lumbar assembly of FIG. 1, illustrated in the retracted position;

FIG. 6 is another rear elevation view of the lumbar assembly of FIG. 1, illustrated in the extended position;

FIG. 8 is a front side elevation view of the lumbar assembly of FIG. 1, illustrated in the retracted position;

FIG. 9 is another front side elevation view of the lumbar assembly of FIG. 1, illustrated in the extended position; and FIG. 10 is an enlarged partial perspective view of a region of the lumbar assembly of FIG. 1.

DETAILED DESCRIPTION

Figure 7:
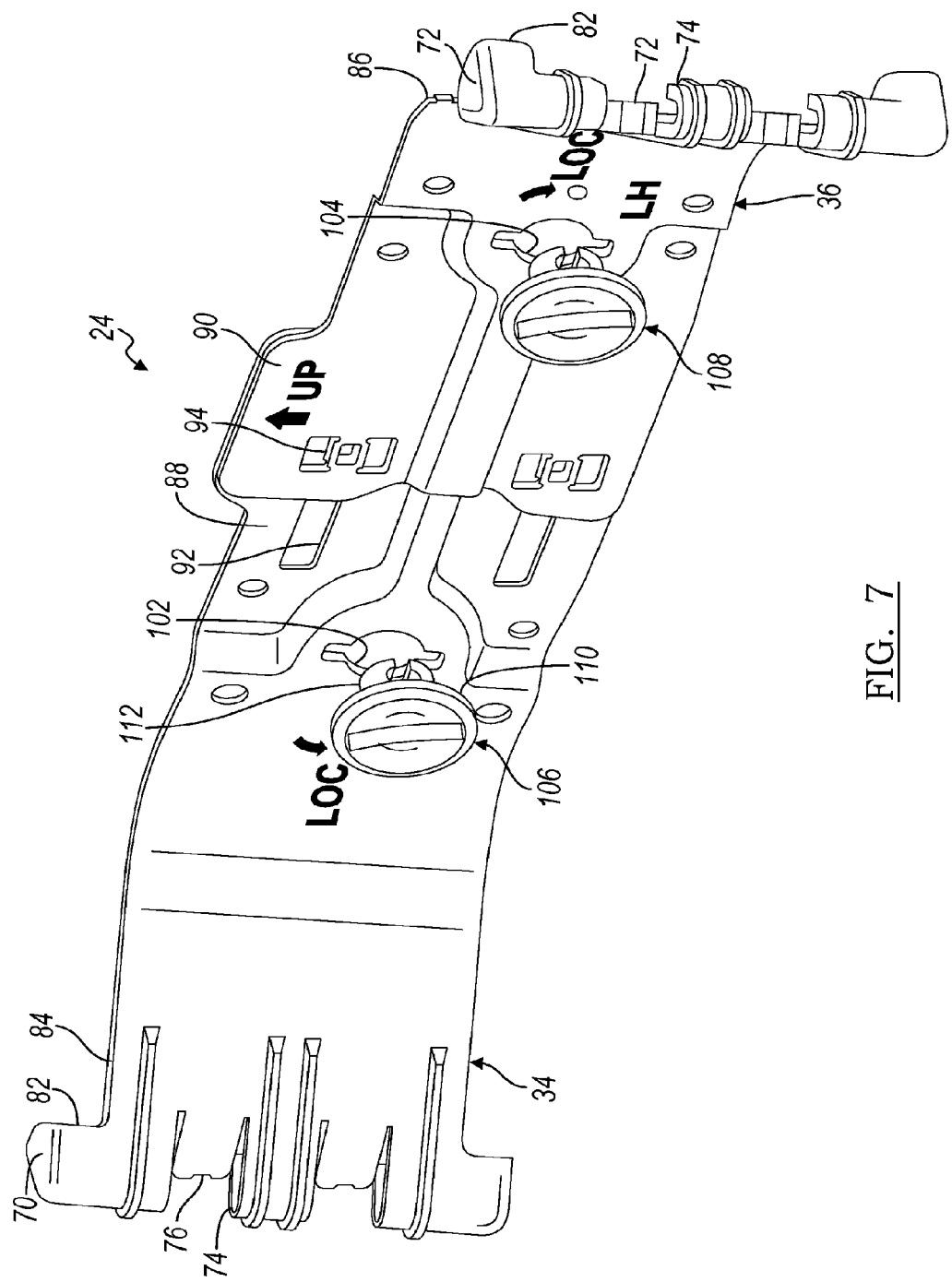
FIG. 7 is a partially exploded perspective view of the lumbar assembly of FIG. 1.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference now to FIG. 1, a seat back for a vehicle seat is illustrated according to an embodiment and is referenced generally by numeral 20. The vehicle seat includes a seat cushion (not shown) that is adapted to be installed within an interior of a vehicle, such as an automobile, aircraft, water craft, or the like, for seating an occupant. The seat back 20 is also installed in the vehicle for supporting the back of the occupant. The seat back 20 may be mounted directly to the vehicle or connected to the seat cushion. Although an individual seat is depicted in FIG. 1, the invention contemplates any seat configuration, such as a bench seat, a split frame seat, a front row seat, a rear row seat, or the like. The seat cushion and the seat back 20 are both fabricated from suitable and known materials and manufacturing methods. For example, the seat cushion may utilize a structural frame, foam for cushioning, and a covering.

In the description, various embodiments, operating parameters, components of the embodiments that are described with directional language, such as "lateral", "intermediate", "outboard", "inboard", "central", "upright", and words of similar import, designate directions shown in the drawings or that are understood in the field of the art. Such directional terminology is used for relative description and clarity and is not intended to limit the orientation of any embodiment or component of any embodiment to a particular direction or orientation.

The seat back 20 extends from the seat cushion. The seat also includes a head restraint (not shown) extending above the seat back 20 for supporting the head of an occupant against the head restraint. The seat back 20 is illustrated with the cover and padding removed for depicting internal components. The seat back 20 includes a frame 22 for providing structural support for the seat back 20. The seat back 20 includes a horizontally adjustable lumbar assembly 24 for providing support to the occupant, while providing adjustability so that the occupant can select the desired level of comfort and support. In at least one embodiment, the seat back frame 22 includes a pair of laterally spaced apart side supports 26, 28 that are each mounted to lateral ends of an upper cross support 30 and a lower cross support 32.

The lumbar assembly 24 includes a pair of flexible lumbar support bands, hereinafter referred to as a first lumbar support band 34 and a second lumbar support band 36. The lumbar support bands 34, 36 are each mounted to a wireframe 38. According to at least one embodiment, the lumbar assembly 24 is an input for an active head restraint system 40.

Referring now to FIGS. 1-3, the active head restraint system 40 includes an armature 42 that is connected to the side supports 26, 28 of the frame 22 by a pair of ramps 44. Each of the ramps 44 includes an arcuate slot 46 for receiving the armature 42 so that the armature 42 can translate within the slots 46 and pivot relative to the slots 46. A pair of posts 48 extend upright from the armature 42 and extend through the upper cross support 30. A pair of bushings 50 are provided in the upper cross support 30 for receiving each post 48 and for permitting each post 48 to pivot and translate within the bushings 50. As is known in the art, a head restraint is provided upon the posts 48. A pair of extension springs 52 are provided interconnecting the armature 42 and one of the side supports 26, 28 for maintaining the armature 42 and consequently the head restraint in a design position.

Referring now to FIG. 4, the wireframe 38 includes a laterally extending upper cross member 54 and a pair of side members 56, 58 extending from the upper cross member and connected to a lower cross member 60. The wireframe 38 also includes a pair of upright wires 62 for mounting lumbar assembly 24 to the frame 22 and to the active head restraint system 40. The upright wires 62 are connected to the cross members 54, 60 of the wireframe 38 by welding or the like. The wireframe 38 includes a pair of lateral portions 64 that extend below the lumbar assembly 24 and each are received in a guide 66. The guides 66 are mounted to the lower cross support 32 of the seat back frame 22 and each include a slot 68 that is inclined rearward for receiving the lateral portion 64. The guides 66 provide a pivotal connection of the lumbar assembly 24 with the frame 22 while also permitting the lower end of the lumbar assembly 24 to translate upward and rearward in response to an impact condition.

The upper ends of the upright wires 62 are pivotally connected to the armature 42 so that an input force to the lumbar assembly 24 during an impact condition actuates the armature 42 upward and rearward. The actuation of the armature 42 causes the armature 42 to translate within the arcuate slots 46 upward and rearward while pivoting in a forward direction. This motion of the armature 42 thereby extends the posts 48 upward from the upper cross support 30, and pivots the posts 48 in a forward direction such that the head restraint is actuated upward and forward for moving the head restraint closer to the occupant's head in an impact condition. In absence of an impact force, the extension springs 52 return the armature 42, and consequently the active head restraint system 40 and the lumbar assembly 24, to the design position illustrated in FIG. 2. Thus, upon receipt of an impact to the lumbar assembly 24, such as a body of the occupant that exceeds a predetermined force to overcome the extension springs 52, the lumbar assembly 24 actuates the active head restraint system 40 for moving the head restraint closer to the head of an occupant for minimizing whiplash during an impact condition. The input force may be generated, for example, the vehicle impacts another object thereby accelerating the seat into the occupant. Such an impact condition may be generated from a rear end impact. Likewise, the impact condition may be generated from a forward impact wherein the occupant rebounds from the seat harness or other mechanism, into the seat.

Prior art head restraint systems often utilize vertically actuatable lumbar support mechanisms. Prior art head restraint systems that utilize horizontally actuatable lumbar mechanisms often include a single lumbar support band having structurally reinforced and structurally weakened regions to permit the band to collapse as it is adjusted forward. Other prior art horizontally adjustable lumbar assemblies include complicated multi-component assemblies that converge as the assembly is extended forward.

By utilizing two flexible support bands 34, 36 that overlap one another and translate relative to one another, a horizontal adjustable lumbar assembly 24 is provided that is relatively compact, and simplified relative to the prior art thereby reducing complexities and costs associated with manufacturing and assembling the lumbar assembly 24. Additionally, by utilizing two support bands 34, 36, no structurally weakened regions are required, thereby enhancing the structural integrity of the lumbar assembly 24. By omitting structurally reinforced regions, material costs and manufacturing costs are reduced.

The lumbar assembly 24 is illustrated in two positions in FIG. 4 for illustrating the adjustment in fore and aft directions. The lumbar assembly 24 is retracted to a rearmost position by translating the first and second support bands 34, 36 away from each other to minimize the overlap. By translating the first and second support bands 34, 36 towards one another, the overlap is increased and the lumbar assembly 24 is actuated forward.

Each of the support bands 34, 36 includes an outboard distal end 70, 72 that is pivotally connected to one of the side members 56, 58 of the wireframe 38. The outboard distal end 72 of the second support band 36 is illustrated pivotally connected to the side member 58 of the wireframe 38 in FIG. 4. Each outboard distal end 70, 72 includes a series of hooks 74 for receiving the wire frame side member 58. A pair of retainers 76 are provided each between a pair of sequential hooks 74 for being pivoted out of the way when the wire frame side member 58 is pressed into the hooks 74, and for returning to the ordinary position illustrated in FIG. 4 for retaining the wire frame side member 58 within the hooks 74 and preventing disassembly.

The upper cross member 54 of the wireframe 38 includes a central region 78. Both cross members 54, 60 include a pair of lateral regions 80 that extend outboard from the central region 78 and are canted relative to the central region 78 in the forward direction. Each of the outboard distal ends 70, 72 includes a pair of guides 82 formed thereon for permitting the flexible support bands 34, 36 to pivot about the associated side member 56, 58 while retaining a position upon the upright side members 56, 58. Additionally, the hooks 74, retainers 76, and guides 82 cooperate with the wireframe 38 for minimizing unwanted noise and vibrations that may lead to buzz, squeak and rattle.

Each of the flexible support bands 34, 36 is formed from a resilient material, such as a polymeric material, such as plastic. Each lumbar support band 34, 36 includes an intermediate portion 84, 86 that extends from the outboard distal end 70, 72 in the aft direction of the seat and generally following the contour of the lateral regions 80 of the wireframe 38, when in a rearmost position. The lumbar support bands 34, 36 each include an inboard extending lateral portion 88, 90 that overlap adjacent the central region 78 of the wireframe 38. As illustrated in FIG. 4, as each of the lateral portions 88, 90 are translated inboard, the intermediate portions 84, 86 flex thereby causing the outboard distal end 70, 72 to pivot so that the lateral portions 88, 90 and intermediate portions 84, 86 move in the forward direction. The cooperation of the lateral portions 88, 90 is provided by guide members.

Referring now to FIGS. 5 and 6, the first lumbar support band 34 has a pair of transverse slots 92 for receiving a pair of projections 94 that extend from the second lumbar support band 36. In order to maintain the cooperation of the slots 92 and projections 94, a retainer flange 96 is provided upon each of the projections 94. In order to assemble the first and second lumbar support bands 34, 36, a pair of apertures 98 are formed in the lateral portion 88 of the first lumbar support band 34 intersecting the slots 92 outside a range of travel of the projections 94 for permitting the retainer flanges 96 to be inserted through the apertures 98, and for the projections 94 to be subsequently translated into the slots 92. In order to prevent inadvertent disassembly of the lumbar support bands 34, 36, a pair of leaf springs 100 are provided at each intersection of the aperture 98 with the slot 92. The leaf springs 100 are sized to extend into the slot 92 so that the leaf springs 100 are pressed out of the range of travel as the projections 94 are inserted into the slots 92. Then the leaf springs 100 return into an unloaded position illustrated in FIG. 5 to provide a stop to a range of travel to the projections 94 so that the projections 94 are retained within the slots 92.

Once assembled, the lumbar support bands 34, 36 may each be extended forward by translating the corresponding lateral portions 88, 90 inboard as illustrated in FIG. 6. Retraction of the lumbar support bands 34, 36 is provided by translating the lateral 88, 90 outboard as illustrated in FIG. 5.

Referring now to FIG. 7, each of the lateral portions 88, 90 of the lumbar support bands 34, 36 includes an aperture 102, 104 that is provided outboard of the guide members 92, 94. A pair of pins 106, 108 are each installed in one of the apertures 102, 104. Each pin 106, 108 includes a head 110 for engaging the corresponding lateral portion 88, 90 and a shank 112 for extending through the corresponding aperture 102, 104. Locking configurations are provided on the shanks 112 for locking the pins 106, 108 at a predetermined rotational orientation. Referring again to FIGS. 4 and 5, a cable assembly 114, such as a Bowden cable is provided for adjusting the lumbar assembly 24. The cable assembly 114 includes a sheath 116 that is connected to the pin 106. An inner cable 118 extends from the sheath 116 and is mounted to the other pin 108. By retracting the cable 118 within the sheath 116, the pins 106, 108 are pulled towards one another as illustrated from FIG. 8 to FIG. 9. Extension of the cable 118 from the sheath 116 extends the pins 106, 108 from each other back to the position of FIG. 8. The resilient structure of the lumbar support bands 34, 36 assists in returning the lumbar support bands 34, 36 to the retracted position as tension is released from the inner cable 118.

Thus, a compact and simplified lumbar assembly 24 is provided which adequately provides horizontal lumbar support and adjustment to the occupant, while optionally providing an input to the active head restraint system 40.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lumbar assembly comprising:
    a wireframe for attachment to a frame of a vehicle seat, the wireframe having first and second spaced apart side members;
    a first flexible lumbar support band mounted to the first wireframe side member, the first lumbar support band having a first lateral portion extending inboard from the first wireframe side member, the first lateral portion having a first guide member; and
    a second flexible lumbar support band mounted to the second wireframe side member, the second lumbar support band having a second lateral portion extending inboard from the second wireframe side member, the second lateral portion having a second guide member cooperating with the first guide member such that the first and second lumbar support bands are adjusted in a fore and aft direction by translating the first and second lateral portions relative to each other along the first and second guide members;
    wherein a slot is formed through the first guide member;
    wherein the second guide member comprises a projection extending through the slot;
    wherein the second guide member further comprises a retainer flange mounted to the projection to retain the projection within the slot; and
    wherein an aperture is formed through the first lateral portion and intersecting the slot outside a range of travel of the projection in the slot during adjustment of the lumbar assembly, the aperture being sized to receive the flange during assembly.

2. The lumbar assembly of claim 1 wherein the first lateral portion comprises a resilient retainer at the intersection of the aperture and the slot for permitting the projection to travel from the aperture to the slot and for retaining the projection within the slot.

3. The lumbar assembly of claim 1 wherein the slot includes a pair of slots formed through the first guide member; and
    wherein the projection comprises a pair of projections, each extending through one of the slots.

4. The lumbar assembly of claim 1 wherein the first lumbar support band includes an intermediate portion extending at least partially in an aft direction and oriented between the first wireframe side member and the first lateral portion; and
    wherein the second lumbar support band includes an intermediate portion extending at least partially in an aft direction and oriented between the second wireframe side member and the second lateral portion.

5. The lumbar assembly of claim 4 further comprising a cable assembly mounted to each of the first and second lumbar support bands for translating the first and second lateral portions along the first and second guide members for extension and retraction of the first and second lateral portions relative to the wireframe for providing adjustment of the lumbar assembly.

6. The lumbar assembly of claim 5 wherein a first aperture is formed through the first lateral portion and a second aperture is formed through the second lateral portion;
    wherein the lumbar assembly further comprises a first pin installed into the first aperture and a second pin installed into the second aperture; and
    wherein the cable assembly comprises a sheath connected to one of the first and second pins, and an inner cable extending from the sheath and connected to the other of the first and second pins so that translation of the inner cable relative to the sheath translates the first and second lateral portions along the first and second guide members.

7. A lumbar assembly comprising:
    a wireframe for attachment to a frame of a vehicle seat, the wireframe having first and second spaced apart side members;
    a first flexible lumbar support band mounted to the first wireframe side member, the first lumbar support band having a first lateral portion extending inboard from the first wireframe side member, the first lateral portion having a first guide member; and
    a second flexible lumbar support band mounted to the second wireframe side member, the second lumbar support band having a second lateral portion extending inboard from the second wireframe side member, the second lateral portion having a second guide member cooperating with the first guide member such that the first and second lumbar support bands are adjusted in a fore and aft direction by translating the first and second lateral portions relative to each other along the first and second guide members;
    wherein the first lumbar support band includes an intermediate portion extending at least partially in an aft direction and oriented between the first wireframe side member and the first lateral portion;
    wherein the second lumbar support band includes an intermediate portion extending at least partially in an aft direction and oriented between the second wireframe side member and the second lateral portion;
    wherein the first lumbar support band has an outboard distal end pivotally connected to the first wireframe side member; and
    wherein the second lumbar support band has an outboard distal end pivotally connected to the second wireframe side member.

8. The lumbar assembly of claim 7 wherein the first and second outboard distal ends each comprise a hook for receiving the corresponding wireframe side member and a retainer for maintaining the wireframe side member within the hook.

9. The lumbar assembly of claim 7 wherein the wireframe further comprises a laterally extending cross member having a central region, a pair of lateral regions extending outboard from the central region and canted relative to the central region in the fore direction, wherein the first and second side members each extend from one of the lateral regions in a direction of a seat back frame.

10. The lumbar assembly of claim 9 wherein the first and second outboard distal ends each comprise a guide for permitting the first and second intermediate portions of the first and second lumbar support bands to pivot relative to the pair of lateral regions of the wireframe.

11. A vehicle seat comprising:
   a seat back frame for supporting a back of an occupant having a pair of spaced apart side supports and at least one cross support connected to the pair of side supports;
   an active head restraint system mounted to the seat back frame;
   a head restraint mounted to the active head restraint system to extend from the seat back for supporting a head of the occupant; and
   a lumbar assembly connected to the active head restraint system for receiving an input force for actuating the active head restraint system for moving the head restraint to an actuated position, the lumbar assembly comprising:
      a wireframe for attachment to a frame of a vehicle seat by connection to the active head restraint system, the wireframe having first and second spaced apart side members,
      a first flexible lumbar support band mounted to the first wireframe side member, the first lumbar support band having a first lateral portion extending inboard from the first wireframe side member, the first lateral portion having a first guide member, and
      a second flexible lumbar support band mounted to the second wireframe side member, the second lumbar support band having a second lateral portion extending inboard from the second wireframe side member, the second lateral portion having a second guide member cooperating with the first guide member such that the first and second lumbar support bands are adjusted in a fore and aft direction by translating the first and second lateral portions relative to each other along the first and second guide members.

12. The vehicle seat of claim 11 wherein the active head restraint system further comprises:
   an armature pivotally connected to the pair of side supports; and
   a pair of posts extending from the armature for supporting the head restraint;
   wherein the lumbar assembly is connected to the armature for actuating the armature in response to the input force.

13. The vehicle seat of claim 12 wherein the wireframe further comprises a pair of upright wires extending above the lumbar assembly and connected to the armature.

14. The vehicle seat of claim 13 wherein the pair of upright wires extend below the lumbar assembly and are connected to the seat back frame to translate upward and rearward and to pivot forward upon actuation from the lumbar assembly.

15. A lumbar assembly comprising:
   a wireframe for attachment to a frame of a vehicle seat, the wireframe having first and second spaced apart side members;
   a first flexible lumbar support band mounted to the first wireframe side member, the first lumbar support band having a first lateral portion extending inboard from the first wireframe side member and a first intermediate portion extending at least partially in an aft direction and oriented between the first wireframe side member and the first lateral portion, the first lateral portion having a slot formed therethrough;
   a second flexible lumbar support band mounted to the second wireframe side member, the second lumbar support band having a second lateral portion extending inboard from the second wireframe side member and a second intermediate portion extending at least partially in an aft direction and oriented between the second wireframe side member and the second lateral portion, the second lateral portion having a projection extending through the slot in the first guide member such that the first and second lumbar support bands are adjusted in a fore and aft direction by translating the first and second lateral portions relative to each other along the first and second guide members; and
   a cable assembly mounted to each of the first and second lumbar support bands for translating the first and second lateral portions along the first and second guide members for extension and retraction of the first and second lateral portions relative to the wireframe for providing adjustment of the lumbar assembly;
   wherein the first lumbar support band has an outboard distal end pivotally connected to the first wireframe side member; and
   wherein the second lumbar support band has an outboard distal end pivotally connected to the second wireframe side member.

16. A method for assembling an adjustable lumbar assembly comprising:
   providing a wireframe with a pair of side members;
   pivotally mounting a first flexible lumbar support member to one of the side members;
   pivotally mounting a second flexible lumbar support member to the other of the side members;
   slidably connecting the first lumbar support member to the second support member; and
   connecting a cable assembly to the first and second lumbar support members to slide the first and second lumbar support members relative to each other for adjusting the lumbar assembly.

17. The method of claim 16 further comprising:
   installing a pin into each of the first and second lumbar support members;
   installing a sheath of the cable assembly to one of the pins; and
   installing an inner cable of the cable assembly to the other of the pins.

* * * * *